United States Patent [19]
Bulson

[11] 3,867,087
[45] Feb. 18, 1975

[54] GAME BALL HEAT CURING APPARATUS

[75] Inventor: Douglas W. Bulson, Sylvania, Ohio

[73] Assignee: The General Tire & Rubber Company, Akron, Ohio

[22] Filed: Aug. 9, 1974

[21] Appl. No.: 495,972

Related U.S. Application Data

[62] Division of Ser. No. 405,601, Oct. 11, 1973.

[52] U.S. Cl............. 425/405 R, 264/310, 425/404, 425/445
[51] Int. Cl............................................. B29h 5/28
[58] Field of Search....... 425/404, 405 R, 445, 384; 156/445; 264/310

[56] References Cited
UNITED STATES PATENTS

| | | | |
|---|---|---|---|
| 2,224,363 | 12/1940 | Voit et al...................... | 156/445 X |
| 2,238,119 | 4/1941 | Larabee............................. | 156/445 |
| 2,279,921 | 4/1942 | Humphrey......................... | 156/445 |
| 2,489,387 | 11/1949 | Roberts............................. | 156/445 |
| 2,509,528 | 5/1950 | Roberts............................. | 156/445 |
| 2,524,680 | 10/1950 | Roberts............................. | 156/445 X |
| 2,536,182 | 1/1951 | Humphrey......................... | 156/445 |
| 2,560,370 | 7/1951 | Roberts............................. | 156/445 |

*Primary Examiner*—J. Howard Flint, Jr.

[57] ABSTRACT

A apparatus for heat curing a continuous succession of hollow spherical objects such as tennis balls. Method includes the steps of passing a succession of the balls from an ambient environment through an airlock into a curing environment of selected elevated curing temperature and selected curing pressure, passing the succession of balls through forming or molding apparatus housed in the curing environment during a selected curing interval, passing the succession of balls from the curing environment through a cooling environment of selected cooling temperature and selected cooling pressure during a selected cooling time interval, and discharging the succession of balls from the cooling environment through an airlock into the ambient environment. The succession of balls may be passed by means of a rotating turntable rolling each ball through a mold formed of a spiral groove of semicircular profile.

21 Claims, 7 Drawing Figures

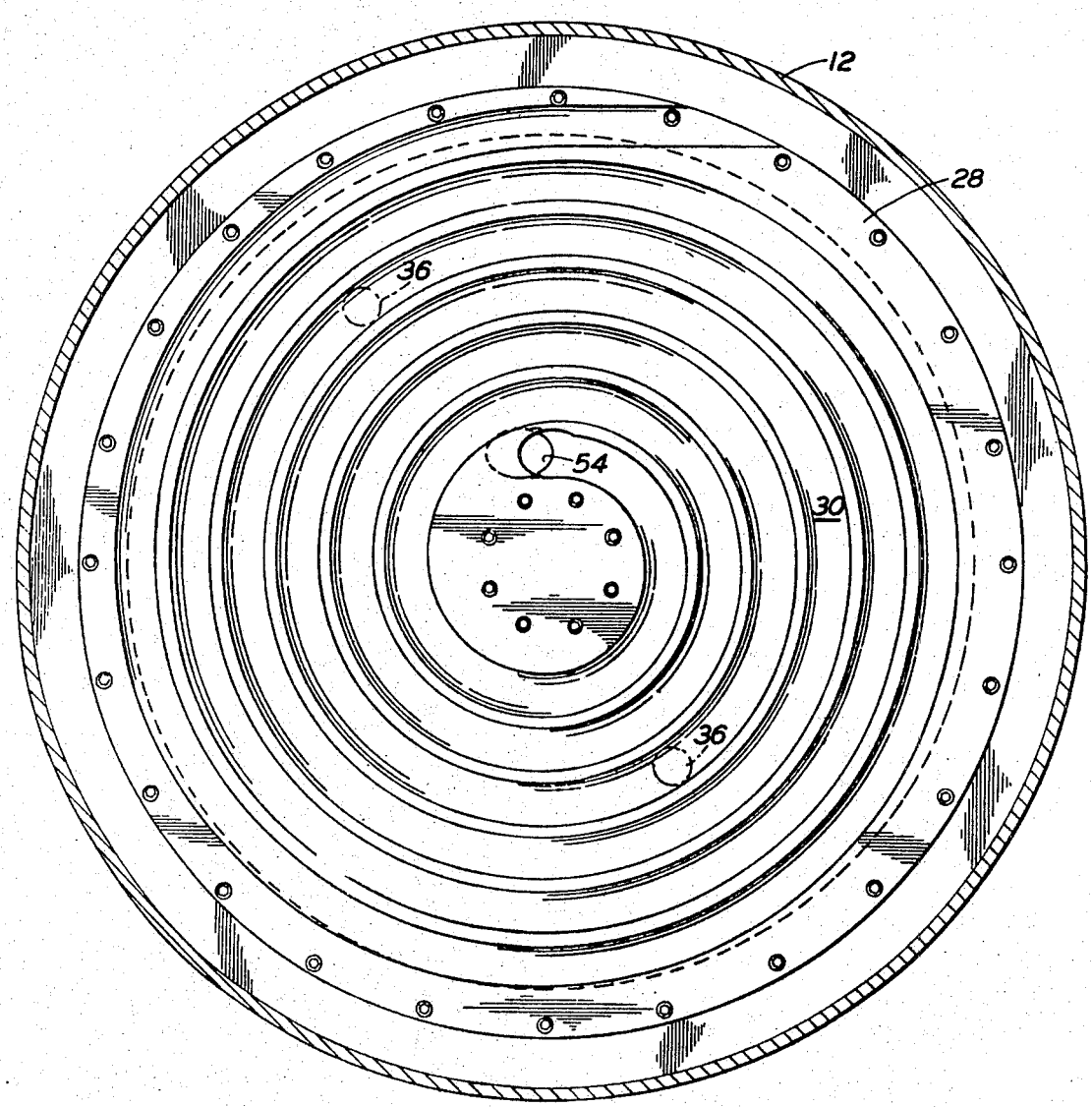

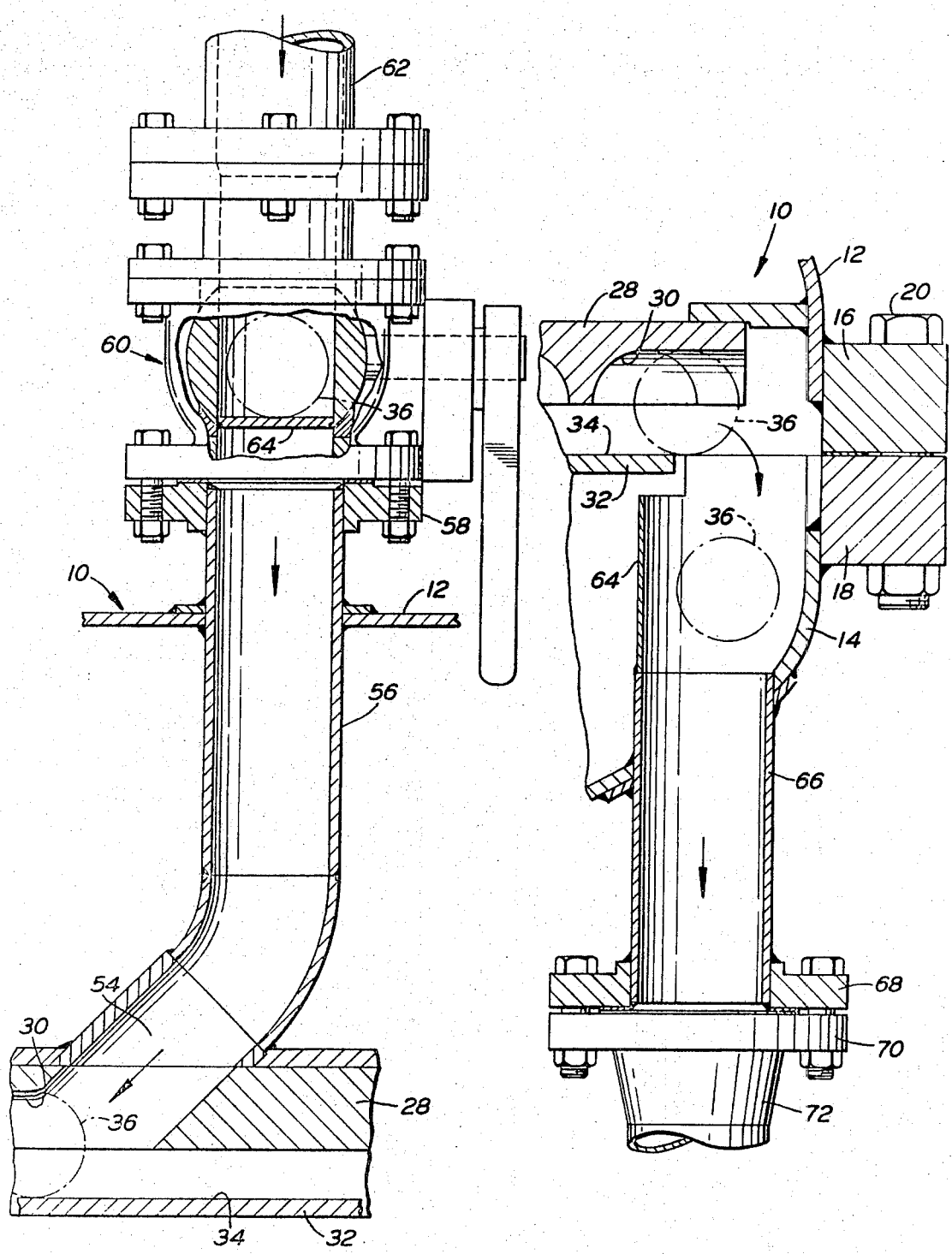

GAME BALL HEAT CURING APPARATUS

This is a division, of application Ser. No. 405,601, filed Oct. 11, 1973.

BACKGROUND OF THE INVENTION

This invention generally pertains to the manufacture of game balls such as tennis balls and more particularly pertains to an apparatus for heat curing the adhesive between the elastomeric core of the ball and the covers of the ball which may be provided of melton cloth, felt or the like.

As well known, tennis balls are manufactured in stages. First, hollow hemispherical elastomeric shells are molded and cured. Next, pairs of the shells are joined with an elastomeric adhesive to form a sphere shaped ball and the adhesive is cured. If the ball is to be of the "pressureless" type, the fluid pressure within the ball may remain the same as or slightly above atmospheric pressure. If the ball is to be of the pressure type, air or gas is introduced in the ball through heat reaction of a chemical or by a hollow needle inserted through the wall of the ball as presently known. The felt covers are formed in a Cassinian or 8-shaped pattern. An elastomeric adhesive is generally applied to the covers and to the ball before the covers are applied and conformed to the ball. The ball is then heated, generally in a shape confining mold, to cure the adhesive.

Much of the manufacture of tennis balls requires individual handling and hand operations though apparatus has been devised as shown in the prior art cited below.

The present invention pertains to an apparatus for heat curing a continuous succession of felt covered balls.

DESCRIPTION OF THE PRIOR ART

Related apparatus for use in manufacturing tennis balls is disclosed in U.S. Pat. Nos. 2,238,119, 2,489,387, 2,279,921, 2,509,528, 2,524,680, 2,536,182 and 2,560,370, for example. Less related apparatus is disclosed in U.S. Pat. Nos. 2,438,089, 2,224,363, 1,883,704 and 1,366,930, for example.

SUMMARY OF THE INVENTION

The present invention eliminates the need for an operator to individually load the cavities of a heat curing mold then individually remove the balls after curing.

The present invention provides a heat curing apparatus which is adapted to cure a large number of balls in continuous fashion.

The present invention provides heat curing apparatus which requires no handling of balls except to provide a supply of uncured balls to the apparatus.

The foregoing and other accomplishments and advantages are attained in a method for heat curing a continuous succession of tennis balls including apparatus for passing a succession of the balls from an ambient environment through an airlock into a curing environment of selected elevated curing temperature and selected curing pressure, passing the succession of balls through forming or molding apparatus housed in the curing environment during a selected curing interval, passing the succession of balls from the curing environment through a cooling environment of selected cooling temperature and selected cooling pressure during a selected cooling time interval, and discharging the succession of balls from the cooling environment through an airlock into the ambient environment. The succession of balls is rolled by means of a rotating turntable through a mold formed of a spiral groove of semicircular profile. The speed of the turn-table and the length of the spiral groove is selected to produce a curing interval of about 5 to 15 minutes. The curing temperature may be in the range of about 200°F. to 350°F. (93.5°C. to 185.5°C.). The curing pressure may be in the range of about 0 to 40 psig (0 to 2.81 Kg/cm$^2$). The cooling temperature may be in the range of about 50°F. to 100°F. (10°C. to 38.5° C.). The succession of balls may pass through the curing environment at the rate of about 5 to 15 balls per minute. The cooling environment is selected to produce a cooling interval of about 5 to 20 minutes.

The related apparatus of the invention comprises a closed chamber adapted to provide a curing environment having a selected curing pressure, a circular molding means mounted within the chamber and defining a continuous molding groove of semicircular cross-section contour disposed in a spiral configuration across a flat surface from near the center to the edge of the molding means with heating means disposed within the chamber and adapted to provide a selected curing temperature within the chamber for the molding means. A drive turntable means defining a circular flat drive surface is disposed in parallel with and in selected proximity to said molding groove with the turntable means being adapted when rotated to roll a succession of tennis balls through the molding groove with the balls being in intimate contact with the semicircular contour of the molding groove. A means for rotating said turntable means is provided. An inlet airlock means is connected into communication with one end of the molding groove and adapted to transfer respective balls of a succession of the balls from outside the chamber into rolling engagement within the molding groove. A cooling means is connected in communication with the other end of the molding groove and adapted to receive the balls as are rolled out of said molding groove and an outlet airlock means is connected in communication with the cooling means and adapted to transfer respective balls of a succession of the balls from the cooling means to outside the apparatus.

BRIEF DESCRIPTION OF THE DRAWINGS

FIG. 5 is a view looking upwardly as taken along the line 5—5 of FIG. 2.

FIG. 6 is a partial sectional view of the inlet airlock valve shown at the top of FIG. 1 and the communicating connection of the valve into the apparatus.

FIG. 7 is a sectional view taken along the line 7—7 of FIG. 1.

DESCRIPTION OF THE PREFERRED EMBODIMENT OF THE INVENTION

Figure 1:
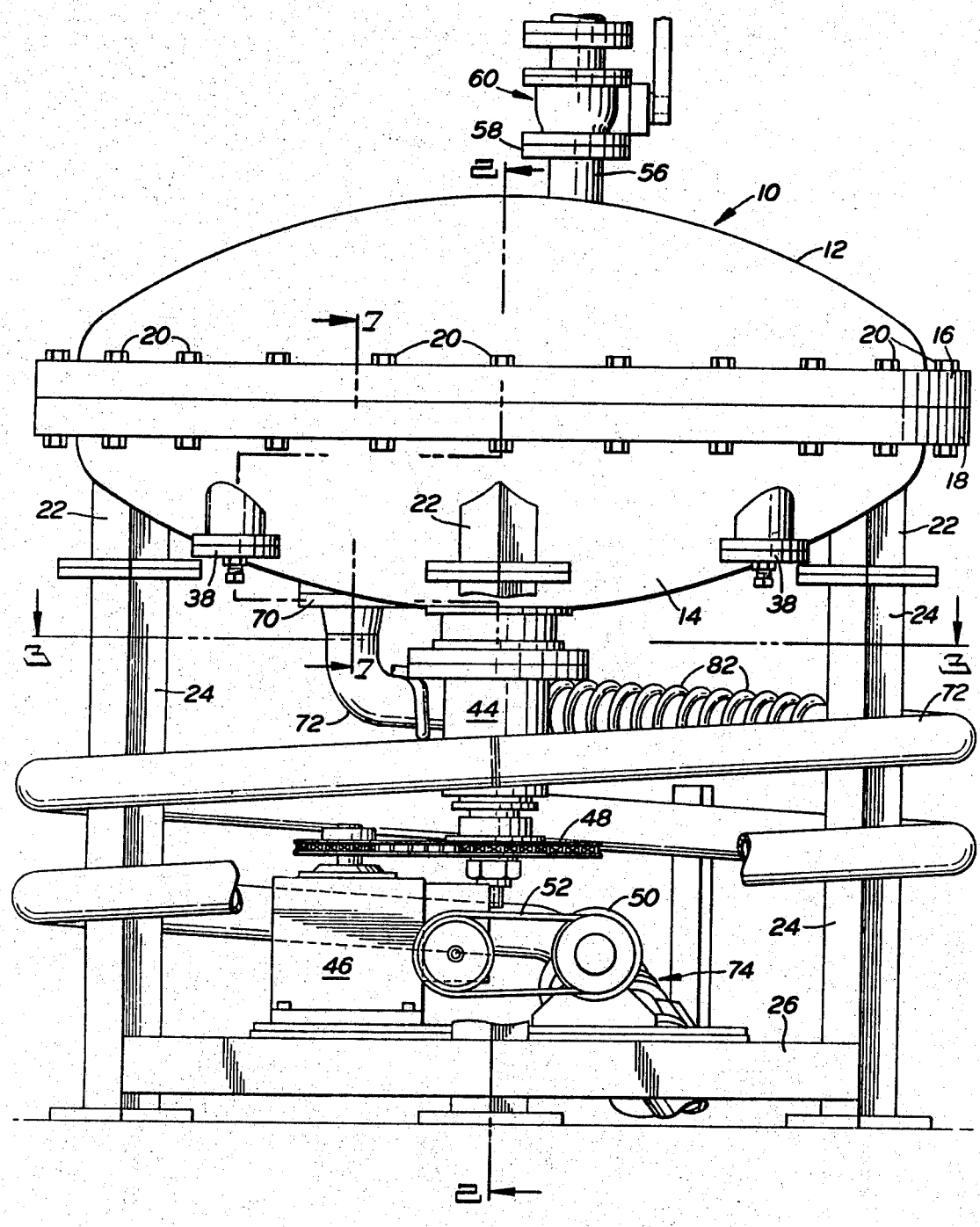
FIG. 1 is an elevational view of the apparatus of the present invention.

The continuous curing apparatus is shown in FIGS.

1 and 2 to include a closed curing chamber 10 formed of an upper shell or head 12 and a lower shell or head 14. The shells 12 and 14 are joined in fluid sealed relation as by welding to flanges 16 and 18. Flanges 16 and 18 are connected in fluid sealed relation by threaded fasteners 20. The chamber 10 as shown may be constructed in accordance with appropriate engineering codes for an unfired pressure vessel having an operating capacity of about 50 psig (3.5 Kg/cm$^2$).

Chamber 10 is mounted on brackets 22 which are in turn mounted on legs 24 of an operating stand 26 as shown.

Figure 2:
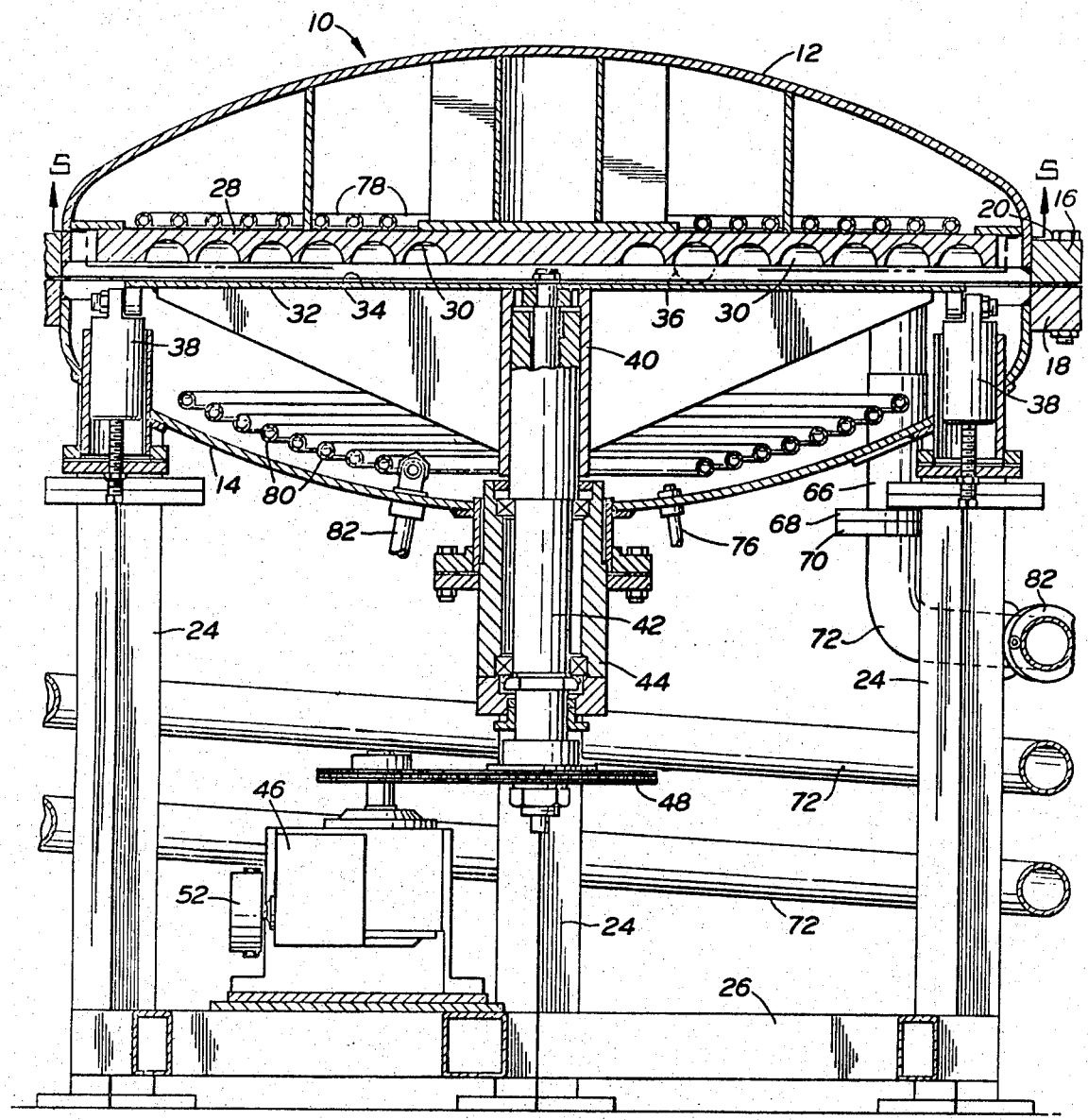
FIG. 2 is a sectional elevational view taken along the line 2—2 of FIG. 1.

As best shown in FIGS. 2 and 5 a flat circular molding member or plate 28 is horizontally and rigidly mounted in upper shell 12 by means of appropriate brackets and threaded fasteners (partially shown). A molding groove 30 of spiral configuration and semicircular cross-section is defined in the lower surface of plate 28 as shown. The cross-sectional radius of the molding groove 30 is substantially the same as the balls to be cured as will later become apparent.

Rotatably mounted below and in parallel relation with molding plate 28 is a circular turntable 32 having an upper surface 34. The distance between molding plate 28 and turntable surface 34 is provided such that a ball 36 located within molding groove 30 will be rolled along in thermal contact with the wall of molding groove 30 through frictional contact with the turntable surface 34 as the turntable 32 is rotated.

Four height adjustment units 38, symetrically mounted under the peripheral edge of turntable 32, are provided to closely adjust the distance between turntable surface 34 and molding plate 28. Two of units 38 are shown in FIG. 2.

A hub 40 is provided on the lower side of turntable 32 which is fitted in splined relation about a drive shaft 42. Drive shaft 42 extends out the bottom of shell 14 through a packing and bearing housing 44 mounted in lower shell 14. Rotation of drive shaft 42 within bearing housing 44 rotates turntable 32.

Figure 3:
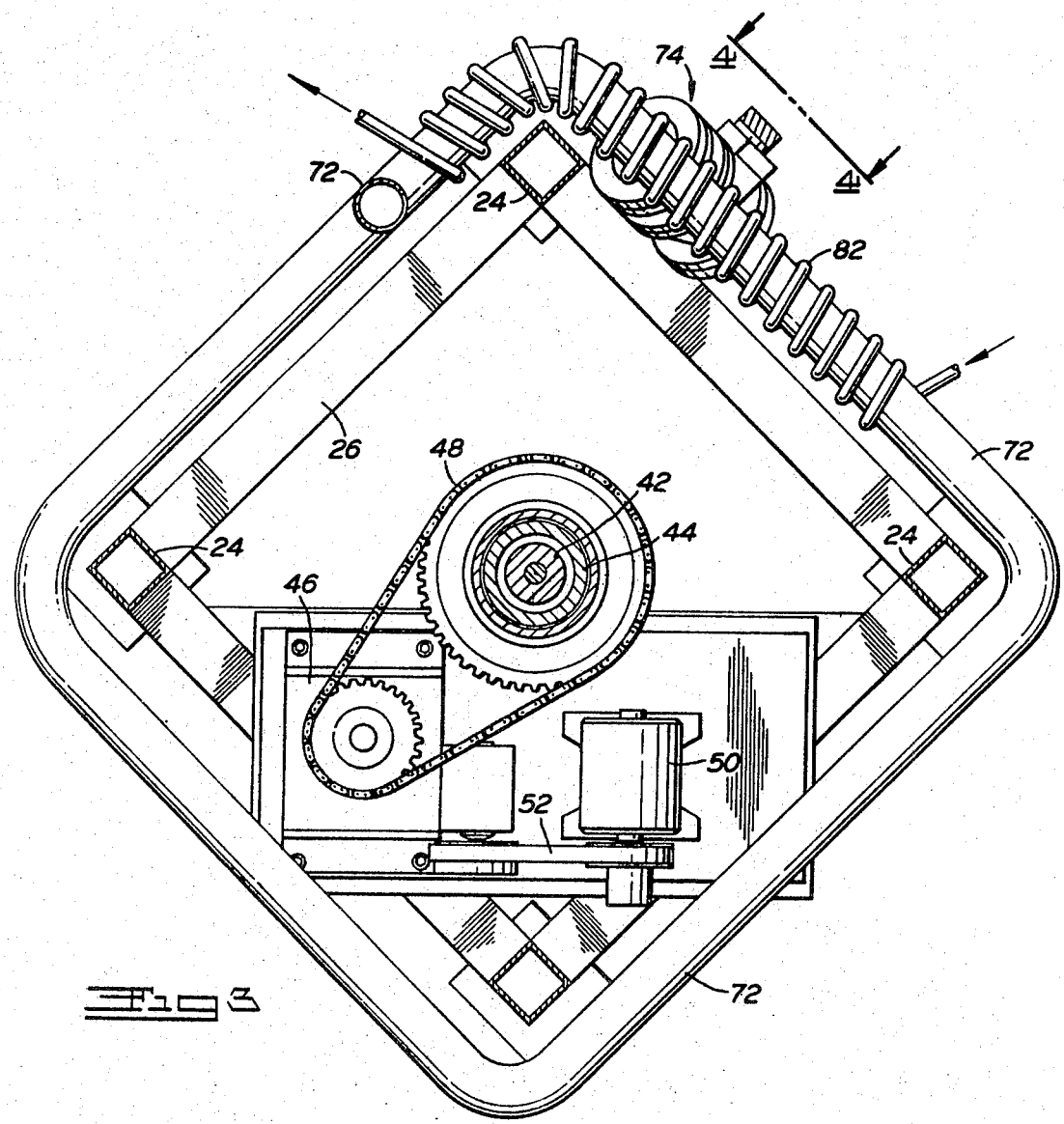
FIG. 3 is a sectional plan view taken along the line 3—3 of FIG. 1.
Figure 4:
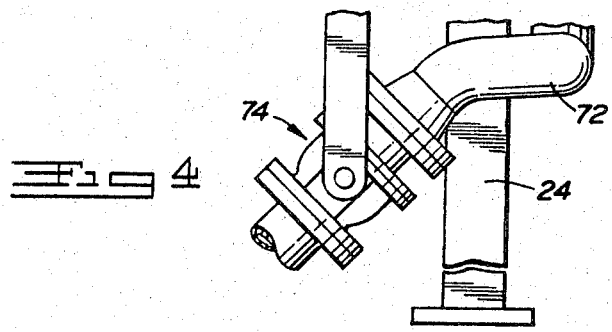
FIG. 4 is an elevational view of the outlet airlock valve taken along the line 4—4 of FIG. 3.

Drive shaft 42 is rotatably connected to a reduction gear unit 46 through a chain and sprocket assembly 48 (FIGS. 2 and 3). Gear unit 46 is connected to a drive motor 50 through a belt drive assembly 52.

Referring now to FIG. 6, taken in view of FIGS. 5, 2 and 1, the spiral molding groove 30 is seen to terminate near the center of molding plate 30 with an inclined passageway 54. Passageway 54 extends upwardly through plate 28 and is connected to a conduit 56 which in turn extends upwardly in sealed relation through shell 12 and terminates with a flange 58.

An inlet airlock valve assembly 60 is connected by threaded fasteners to flange 58. Attached to the top of valve 60 is an inlet conduit 62 which leads to a supply hopper or other source of balls (not shown). The inlet airlock comprises a conventional ball plug valve which has been modified to be rotated through 180°. One end of the passage through the ball plug has been blinded off by a welded plate as shown. When the valve is in a first position as shown a ball may drop in the plug passageway to be retained on the plate. When the ball plug is rotated through 180° the ball thereon drops through conduit 56 and passageway 54 onto turntable surface 34. Rotation of turntable 32 then rolls the ball into and through the spiral molding groove 30. Thus each time that valve 60 is returned to the position shown, then cycled 180°, a ball is introduced into chamber 10 and molding groove 30 with minimal loss of fluid pressure. Appropriate linkage (not shown) may be used to cycle valve 60 on a timed basis or as a function of the rotation of turntable 32.

As seen in FIG. 5, the outer end of spiral molding groove 30 continues through the outer periphery of molding plate 28 in tangential fashion. As best seen in FIG. 7, the end of molding groove 30 terminates above an outlet hopper 64. Hopper 64 is connected to a conduit 66 which extends in sealed relation through the wall of shell 14 and terminates with a flange 68. Flange 68 is threadedly connected to a flange 70 of cooling chamber 72.

As rotation of turntable surface 34 causes each ball 36 to roll through the route defined by molding groove 30, the ball reaches the end of the groove and drops through the hopper 64 and conduit 66 into cooling chamber 72.

Cooling chamber 72, best shown in FIGS. 1–4, is an elongated downwardly inclined passageway which is formed around the legs 24 of stand 26 as a matter of convenience. The cooling chamber terminates in an outlet airlock valve 74 shown in FIGS. 1, 3 and 4. The internal construction (not shown) of valve 74 may be identical to that of the valve 60 shown in FIG. 6 with the same manner of operation as previously described. The linkages of airlock valves 60 and 74 may be coordinated to permit a like succession of balls to enter into and to leave out of the curing apparatus 10.

As seen in FIG. 3, the curing environment within chamber 10 is maintained at a selected pressure by admitting a compressible fluid such as air into the chamber through a fitting 76.

Heating coils 78 are mounted above and adjacent the molding plate 28 to maintain the plate at an elevated curing temperature. Additional heating coils 80 are disposed in the chamber 10 below the turntable 32 to supplement the heating of the coils 78. Coils 78 and 80 are illustrated as being steam coils being fed through steam inlet 82 but electrical coils or the like also may be utilized.

As also shown in FIGS. 1–3, a cooling coil 82, through which a cooling fluid such as water may be passed, may encompass part or all of cooling chamber 72 for the purpose of maintaining a desired cooling temperature to cool the balls 36 leaving curing chamber 10 and passing through the cooling chamber.

It is to be noted that some of the adhesive between the cover and the core of balls such as tennis balls is exposed at the seams of the cover. Such exposed adhesive tends to be sticky or tacky in nature at least during the early part of the curing cycle of each ball passing through molding groove 30. For this reason slick or smooth non-adhering surfaces for turntable surface 34 and molding groove 30 are desirable. Metal plating may be of some assistance in providing such slick surfaces. The recommended means of providing such slick surfaces to turntable surface 34 and molding groove 30 is to apply a coating of a fluorocarbon resin to such surfaces. Such resins, commonly referred to as TFE and FEP resins, are marketed under the Teflon trademark by E. I. duPont de Nemours and Co., Inc.

DESCRIPTION OF THE OPERATION OF THE PREFERRED EMBODIMENT

The operation involves a sequence of steps for a respective ball of a succession or series of balls to be cured but desirably is continuous for the series of balls from the beginning through the end of the curing process.

Initially, uncured balls are successively passed into the curing environment of chamber 10 through the inlet airlock 60. The curing environment is maintained at a curing temperature in the range of about 200°F. to 300°F. (93.5°C. to 185.5°C.) depending on the curing time interval and the nature of the particular adhesive composition to be cured. The curing environment is maintained at a curing pressure in the range of about 0 to about 40 psig (0 to 2.81 Kg/cm²). Such pressure is selected as being substantially the same as the maximum pressure occuring within the ball while the ball is subjected to the curing temperature.

The series of balls are next passed through the curing and molding environment during a selected curing time interval. Such time interval may be selected in the range of about 5 to 15 minutes, depending on the curing temperature and the nature of the adhesive composition. A desirable curing time is about 8 minutes. As disclosed, the balls may be passed through the curing environment by rolling the balls by means of a rotating turntable 32 through the molding groove 30 of semicircular molding profile. The curing time may be established by selecting the speed of the turntable as a function of the length of molding groove 30. The turntable may be turned at a speed of about 2/3 R.P.M., for example.

The series of balls are next passed from the curing/molding environment into a cooling environment embodied as cooling chamber 72 which is provided with selected pressure and selected cooling temperature. In the disclosed embodiment, the cooling pressure is the same as the curing pressure. However, if desirable, an airlock can be provided between the curing chamber and the cooling chamber and a different cooling pressure can then be provided.

The cooling temperature may be in the range of about 50°F. to 100°F. (10°C. to 38.5°C.) depending on the cooling time interval that each ball of the series of balls remains in the cooling environment. The cooling time may be in the order of about 5 to 20 minutes.

The series of balls are last discharged from the cooling environment through an outlet airlock 74.

The above conditions may be established such that the series of balls will be passed through the curing and cooling process at the rate of about 500 per hour.

The particular tennis ball cover adhesive compositions may vary considerably in curing time and related characteristics. Routine testing will establish the temperature, curing time, and cooling time for optimum practice of the process.

The foregoing description and drawings will suggest other embodiments and variations to those skilled in the art, all of which are intended to be included in the spirit of the invention as herein set forth.

That being claimed is:

1. Apparatus for heat curing a continuous series of spherical balls such as tennis balls, comprising:
   A. a closed chamber adapted to provide a curing environment having a selected curing pressure;
   B. circular molding means mounted within said chamber and defining a continuous molding groove of semicircular cross-sectional contour disposed in a spiral configuration across a flat surface from near the center to the edge of said molding means;
   C. heating means disposed within said chamber and adapted to provide a selected curing temperature within said chamber for said molding means;
   D. drive turntable means defining a circular flat drive surface disposed in parallel with and in selected proximity to said molding groove;
   E. said turntable means being adapted when rotated to roll a series of said balls through said molding groove with said balls being in intimate contact with the semicircular contour of said molding groove;
   F. means for rotating said turntable means;
   G. inlet airlock means connected into communication with one end of said molding groove and adapted to transfer respective balls of a series of said balls from outside said chamber into rolling engagement within said molding groove;
   H. cooling means connected in communication with the other end of said molding groove and adapted to receive said balls as are rolled out of said molding groove; and
   K. an outlet airlock means connected in communication with said cooling means and adapted to transfer respective balls of a succession of said balls from said cooling means to outside said apparatus.

2. The apparatus of claim 1 wherein the speed of said turntable means and the length of said molding groove is selected to maintain a respective ball in curing contact within said molding groove for a time interval in the range of about 5 to 15 minutes.

3. The apparatus of claim 1 wherein said succession of balls passes through said apparatus at a selected rate in the range of about 5 to 15 balls per minute.

4. The apparatus of claim 1 wherein said curing pressure is maintained at a pressure selected in the range of 0 to 40 psig (0 to 2.81 Kg/cm²).

5. The apparatus of claim 1 wherein said curing temperature is maintained at a temperature selected in the range of about 200°F. to 350°F. (93.5°C. to 185.5°C.).

6. The apparatus of claim 1 wherein said cooling means is maintained at a temperature selected in the range of about 50°F. to 100°F. (10°C. to 38.5°C.).

7. The apparatus of claim 1 wherein a respective ball in said succession of balls remains in said cooling means for a time interval selected in the range of about 5 to 20 minutes.

8. The apparatus of claim 2 wherein said curing pressure is maintained at a pressure selected in the range of 0 to 40 psig (0 to 2.81 Kg/cm²).

9. The apparatus of claim 8 wherein said curing temperature is maintained at a temperature selected in the range of about 200°F. to 350°F. (93.5°C. to 185.5°C.).

10. The apparatus of claim 9 wherein said cooling means is maintained at a temperature selected in the range of about 50°F. to 100°F. (10°C. to 38.5°C.).

11. The apparatus of claim 10 wherein a respective ball in said succession of balls remains in said cooling means for a time interval selected in the range of about 5 to 20 minutes.

12. The apparatus of claim 11 wherein said series of balls passes through said apparatus at a selected rate in the range of about 5 to 15 balls per minute.

13. Apparatus for heat curing a continuous succession of tennis balls, comprising:
   A. a closed chamber adapted to provide a curing environment having a selected curing pressure;

B. circular molding means mounted within said chamber and defining a continuous molding groove of semicircular cross-sectional contour disposed in a spiral configuration across a flat surface from near the center to the edge of said molding means;
C. heating means disposed within said chamber and adapted to provide a selected curing temperature within said chamber for said molding means;
D. drive turntable means defining a circular flat drive surface disposed in parallel with and in selected proximity to said molding groove;
E. said turntable means being adapted when rotated to roll a succession of said balls through said molding groove with said balls being in intimate contact with the semicircular contour of said molding groove;
F. inlet airlock means connected into communication with one end of said molding groove and adapted to transfer respective balls of a succession of said balls from outside said chamber into rolling engagement within said molding groove; and
G. an outlet airlock means connected in communication with the other end of said groove and adapted to transfer respective balls of a succession of said balls as are rolled out of said groove to outside said apparatus.

14. The apparatus of claim 13 wherein said inlet airlock means and said outlet airlock means each comprise a rotatable valve means.

15. The apparatus of claim 13 wherein said inlet airlock and said outlet airlock means each comprise a blinded off plug valve rotatable through at least 180°.

16. Apparatus for heat curing a continuous series of hollow spherical objects such as tennis balls comprising: means for passing a series of said balls from an ambient environment through an airlock into a curing environment provided of selected elevated curing temperature and selected curing pressure, means for passing said series of said balls through molding apparatus housed in said curing environment during a selected curing interval, means for passing said series of said balls from the curing environment through a cooling environment provided of selected cooling temperature and selected cooling pressure during a selected cooling time interval, and means for discharging said series of said balls from the cooling environment through an airlock into the ambient environment.

17. The apparatus of claim 16 wherein said succession of balls is provided to pass through said apparatus at a selected rate in the range of about 5 to 15 balls per minute.

18. The apparatus of claim 16 wherein said curing pressure is provided to be maintained at a pressure selected in the range of 0 to 40 psig (0 to 2.81 Kg/cm$^2$).

19. The apparatus of claim 16 wherein said curing temperature is provided to be maintained at a temperature selected in the range of about 200°F. to 350°F. (93.5°C. to 185.5°C.).

20. The apparatus of claim 16 wherein said cooling environment is provided to be maintained at a temperature selected in the range of about 50°F. to 100°F. (10°C. to 38.5°C.).

21. The apparatus of claim 18 wherein a respective ball in said series of balls is provided to remain in said cooling environment for a time interval selected in the range of about 5 to 20 minutes.

* * * * *